US011506871B2

(12) United States Patent
Kim

(10) Patent No.: US 11,506,871 B2
(45) Date of Patent: Nov. 22, 2022

(54) OPTICAL IMAGING SYSTEM

(71) Applicant: Samsung Electro-Mechanics Co., Ltd., Suwon-si (KR)

(72) Inventor: Hag Chul Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 201 days.

(21) Appl. No.: 16/913,559

(22) Filed: Jun. 26, 2020

(65) Prior Publication Data

US 2020/0326511 A1   Oct. 15, 2020

Related U.S. Application Data

(63) Continuation of application No. 15/585,646, filed on May 3, 2017, now Pat. No. 10,732,384.

(30) Foreign Application Priority Data

Dec. 22, 2016  (KR) .................. 10-2016-0176315

(51) Int. Cl.
*G02B 13/00* (2006.01)
(52) U.S. Cl.
CPC ................ *G02B 13/0045* (2013.01)
(58) Field of Classification Search
CPC ...... G02B 13/0045; G02B 1/041; G02B 1/02; G02B 3/0087; G02B 9/60; G02B 2003/0093
See application file for complete search history.

(56) References Cited

U.S. PATENT DOCUMENTS

| 8,482,863 | B2 | 7/2013 | Tsai et al. |
| 8,687,293 | B2 | 4/2014 | Chen et al. |
| 10,175,459 | B2 | 1/2019 | Kim |
| 10,627,601 | B2 | 4/2020 | Kim |
| 2001/0004301 | A1 | 6/2001 | Kodama et al. |
| 2001/0022698 | A1* | 9/2001 | Sato ............. G02B 13/0045 359/733 |
| 2012/0127359 | A1 | 5/2012 | Chen et al. |
| 2012/0154929 | A1 | 6/2012 | Tsai et al. |
| 2013/0093942 | A1 | 4/2013 | Okano |
| 2013/0265650 | A1 | 10/2013 | Chen et al. |
| 2013/0321932 | A1 | 12/2013 | Hsu et al. |

(Continued)

FOREIGN PATENT DOCUMENTS

| CN | 201926812 U | 8/2011 |
| CN | 102478704 A | 5/2012 |

(Continued)

OTHER PUBLICATIONS

Chinese Office Action dated Nov. 26, 2019, in counterpart Chinese Patent Application No. 201710541885.X (10 pages in English and 7 pages in Chinese).

(Continued)

*Primary Examiner* — James C. Jones
(74) *Attorney, Agent, or Firm* — NSIP Law

(57) ABSTRACT

An optical imaging system includes five lenses in which a first lens includes a positive refractive power and a concave object-side surface, and a second lens includes a positive refractive power and a concave image-side surface. The first to fifth lenses are sequentially disposed from an object side to an image side.

10 Claims, 6 Drawing Sheets

(56) References Cited

U.S. PATENT DOCUMENTS

| | | |
|---|---|---|
| 2014/0085736 A1 | 3/2014 | Chen et al. |
| 2015/0185440 A1 | 7/2015 | Chen |
| 2016/0131871 A1 | 5/2016 | Tang et al. |
| 2016/0209627 A1 | 7/2016 | Seo et al. |
| 2017/0102523 A1 | 4/2017 | Chen et al. |
| 2017/0153424 A1 | 6/2017 | Kim |
| 2018/0164551 A1 | 6/2018 | Kim |
| 2020/0201004 A1 | 6/2020 | Kim |

FOREIGN PATENT DOCUMENTS

| | | |
|---|---|---|
| CN | 102540423 A | 7/2012 |
| CN | 202661703 U | 1/2013 |
| CN | 103364924 A | 10/2013 |
| CN | 103389566 A | 11/2013 |
| CN | 204731475 U | 10/2015 |
| CN | 207074296 U | 3/2018 |
| JP | 2006-293042 A | 10/2006 |
| KR | 10-1499970 B1 | 3/2015 |
| KR | 10-2016-0089743 A | 7/2016 |

OTHER PUBLICATIONS

U.S. Appl. No. 15/095,818, filed Apr. 11, 2016, Hag Chul Kim, Samsung Electro-Mechanics Co., Ltd.

U.S. Appl. No. 15/585,646, filed May 3, 2017, Hag Chul Kim, Samsung Electro-Mechanics Co., Ltd.

Chinese Office Action dated Dec. 30, 2021, in counterpart Chinese Patent Application No. 202110181783.8 (12 pages in English, 9 pages in Mandarin).

U.S. Appl. No. 16/807,576, filed Mar. 3, 2020, Hag Chul Kim, Samsung Electro-Mechanics Co., Ltd.

Chinese Office Action dated Jun. 13, 2022, in counterpart Chinese Patent Application No. 202110181783.8 (8 pages in English, 7 pages in Chinese).

* cited by examiner

| SURFACE NO. | RADIUS OF CURVATURE | THICKNESS, GAP | REFRACTIVE INDEX | ABBE NUMBER(vd) |
|---|---|---|---|---|
| Object | Infinity | | | |
| 1 | -22.5243 | 1.3800 | 1.696 | 55.46 |
| 2 | -12.8575 | 0.1000 | | |
| 3 | 3.3150 | 1.2269 | 1.696 | 55.46 |
| 4 | 14.1846 | 0.3500 | | |
| 5(stop) | Infinity | 0.2500 | | |
| 6 | -14.6469 | 0.4500 | 1.752 | 25.05 |
| 7 | 5.8597 | 0.6000 | | |
| 8 | -7.7102 | 1.3000 | 1.834 | 37.34 |
| 9 | -3.6559 | 0.1550 | | |
| 10* | 17.9709 | 1.3835 | 1.660 | 20.4 |
| 11* | 8.1556 | 0.6910 | | |
| 12 | Infinity | 2.8968 | | |
| Image | Infinity | -0.0052 | | |

FIG. 3

| | K | A | B | C | D | E |
|---|---|---|---|---|---|---|
| 10 | -516.65706 | -0.01012623 | -0.00349913 | 0.00029102 | 4.271257E-5 | -3.048858E-5 |
| 11 | 1.163209 | -0.01422418 | -0.00071269 | 0.00022846 | -3.683781E-5 | 2.107945E-6 |

| SURFACE NO. | RADIUS OF CURVATURE | THICKNESS, GAP | REFRACTIVE INDEX | ABBE NUMBER(vd) |
|---|---|---|---|---|
| Object | Infinity | | | |
| 1 | -16.7391 | 1.3800 | 1.696 | 55.46 |
| 2 | -10.9800 | 0.1000 | | |
| 3 | 3.3784 | 1.3000 | 1.696 | 55.46 |
| 4 | 16.5669 | 0.3500 | | |
| 5(stop) | Infinity | 0.2500 | | |
| 6 | -11.4902 | 0.4500 | 1.752 | 25.05 |
| 7 | 6.7742 | 0.5981 | | |
| 8 | -7.7203 | 1.3000 | 1.883 | 40.80 |
| 9 | -3.6559 | 0.1550 | | |
| 10* | 20.8304 | 1.4000 | 1.660 | 20.4 |
| 11* | 8.8445 | 0.6911 | | |
| 12 | Infinity | 2.5827 | | |
| Image | Infinity | -0.0082 | | |

FIG. 7

| | K | A | B | C | D | E |
|---|---|---|---|---|---|---|
| 10 | -516.65706 | -0.01012623 | -0.00349913 | 0.00029102 | 4.271257E-5 | -3.048858E-5 |
| 11 | 1.163209 | -0.01422418 | -0.00071269 | 0.00022846 | -3.683781E-5 | 2.107945E-6 |

FIG. 8

OPTICAL IMAGING SYSTEM

CROSS-REFERENCE TO RELATED APPLICATIONS

This application is a continuation of application Ser. No. 15/585,646 filed on May 3, 2017, now U.S. Pat. No. 10,732,384 issued on Aug. 4, 2020, and claims the benefit under 35 USC 119(a) of Korean Patent Application No. 10-2016-0176315 filed on Dec. 22, 2016, in the Korean Intellectual Property Office, the entire disclosures of which are incorporated herein by reference.

BACKGROUND

1. Field

The following description relates to an optical imaging system.

2. Description of Related Art

In general, camera modules are mounted in mobile communications terminals, computers, vehicles, a camera, a mobile device, or a tablet, enabling images of the surrounding environment to be captured.

In accordance with the trend for slimness of mobile communications terminals, camera modules have been required to have a small size and high image quality.

Further, camera modules for vehicles have also been required to have a small size and high image quality to prevent obstruction of a driver's visual field or negatively affect an appearance of a vehicle.

For instance, a camera used in a rearview mirror of the vehicle should be able to capture a clear image in order to secure a view of a rear visual field during vehicle operation, and is thus needs to have high image quality.

In addition, a camera used in a vehicle needs to be able to clearly capture an image of an object, even at night time when an illumination is low. Therefore, a lens system that has a small size and captures an image in both a visible region and a near infrared region of the visible spectrum is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system including a first lens including a positive refractive power and a concave object-side surface; a second lens including a positive refractive power and a concave image-side surface; a third lens; a fourth lens; and a fifth lens, wherein the first to fifth lenses are sequentially disposed from an object side to an image side.

Object-side surfaces and image-side surfaces of the first lens, the second lens, the third lens, and the fourth lens may be spherical, and an object-side surface and an image-side surface of the fifth lens may be aspherical.

The first to fourth lenses may be formed of glass, and the fifth lens may be formed of plastic.

The third lens may include a negative refractive power, a concave object-side surface, and a concave image-side surface.

The fourth lens may include a positive refractive power, a concave object-side surface, and a convex image-side surface.

The fifth lens may include a negative refractive power, a convex object-side surface, and a concave image-side surface.

$-6.5 < \{(1/f)*(Y/\tan \theta)-1\}*100 < -1.0$ may be satisfied, where f is an overall focal length of the optical imaging system, Y is one-half of a diagonal length of an imaging plane of an image sensor, and θ is one-half of a field of view (FOV) of the optical imaging system.

$TTL/(2Y) < 2.0$ may be satisfied, where TTL is a distance from the object-side surface of the first lens to an imaging plane of an image sensor, and Y is one-half of a diagonal length of the imaging plane of the image sensor.

$-7.0 < R1/f < 5.0$ may be satisfied, where R1 is a radius of curvature of the object-side surface of the first lens, and f is an overall focal length of the optical imaging system.

$-0.5 < (R1+R2)/(R1-R2) < 5.5$ may be satisfied, where R1 is a radius of curvature of the object-side surface of the first lens, and R2 is a radius of curvature of an image-side surface of the first lens.

$0.1 < f/f1 < 0.6$ may be satisfied, where f is an overall focal length of the optical imaging system, and f1 is a focal length of the first lens.

$1.5 < f/EPD < 2.4$ may be satisfied, where f is an overall focal length of the optical imaging system, and EPD is an entrance pupil diameter of the optical imaging system.

$5.0 < (T1+T2)/T3 < 12.0$ may be satisfied, where T1 is a thickness of the first lens, T2 is a thickness of the second lens, and T3 is a thickness of the third lens.

$v5 < 24$ may be satisfied, where v5 is an Abbe number of the fifth lens.

$-2.5 < f/f3 < -1.0$ may be satisfied, where f is an overall focal length of the optical imaging system, and f3 is a focal length of the third lens.

An overall focal length f of the optical imaging system may be between 7.0 mm to 7.5 mm.

A constant Fno indicating a brightness of the optical imaging system may be 2.22 or less.

A field of view of the optical imaging system may be between 43.51° to 46.4°.

In accordance with an embodiment, there is provided an optical imaging system, including a first lens including a positive refractive power and a concave object-side surface; a second lens including a positive refractive power; a third lens including a negative refractive power; a fourth lens including a positive refractive power; and a fifth lens including a negative refractive power, wherein the first to fifth lenses are sequentially disposed from an object side to an image side, and the fifth lens is formed of plastic, and includes an aspherical object-side surface and an aspherical image-side surface.

The first to fourth lenses may be formed of a material having optical characteristics different from a material of the fifth lens, and object-side surfaces and image-side surfaces of the first to fourth lenses may be spherical.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings.

FIG. 3 is a table representing respective characteristics of lenses of the optical imaging system illustrated in FIG. 1.

FIG. 7 is a table representing respective characteristics of lenses of the optical imaging system illustrated in FIG. 5.

FIG. 8 is a table representing aspherical coefficients of lenses of the optical imaging system illustrated in FIG. 5.

Figure 1:
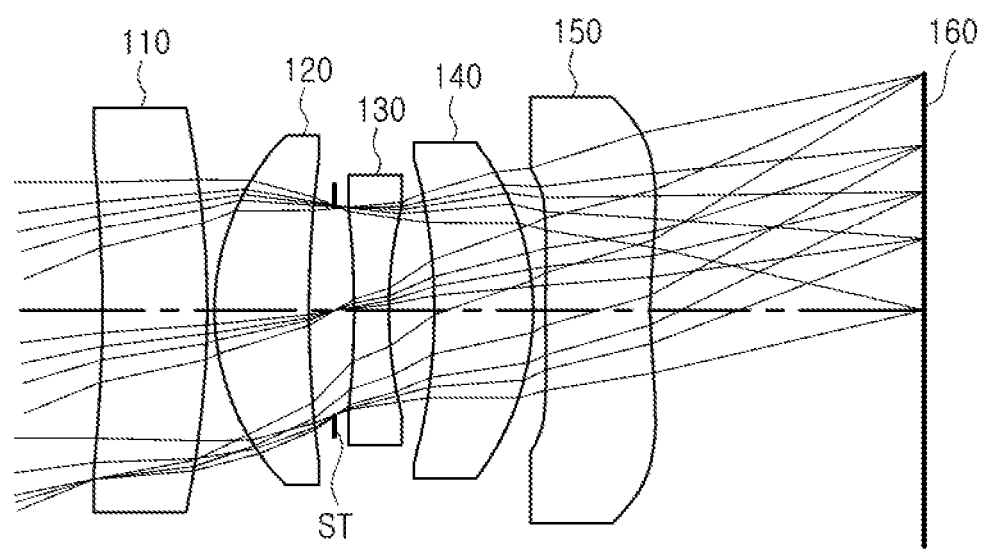
FIG. 1 is a view illustrating an optical imaging system according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be apparent that though the terms first, second, third, etc., may be used herein to describe various members, components, regions, layers, and/or sections, these members, components, regions, layers, and/or sections should not be limited by these terms. These terms are only used to distinguish one member, component, region, layer, or section from another member, component, region, layer, or section. Thus, a first member, component, region, layer, or section discussed below could be termed a second member, component, region, layer, or section without departing from the teachings of the embodiments.

Hereinafter, various embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be formed by one or a combination thereof.

In accordance with an embodiment, a first lens is a lens closest to an object or a subject from which an image is captured. A fifth lens is a lens closest to an image sensor or closest to an imaging plane.

In addition, a first surface of each lens refers to a surface thereof closest to an object side (or an object-side surface) and a second surface of each lens refers to a surface thereof closest to an image side (or an image-side surface). Further, all numerical values of radii of curvature and thicknesses of lenses, Y (one-half of a diagonal length of an imaging plane of the image sensor), and the like, are indicated in millimeters (mm), and a field of view (FOV) of an optical imaging system is indicated in degrees. In addition, in an embodiment, thicknesses and radii of curvatures of lenses are measured in relation to optical axes of the corresponding lenses.

Further, concerning shapes of the lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

The paraxial region refers to a very narrow region in the vicinity of an optical axis.

In accordance with an embodiment, an optical imaging system is described in which an aberration improvement effect may be increased, a high level of resolution may be implemented, an image may be captured even in an environment in which an illumination is low, a field of view may be wide, and a deviation in resolution may be suppressed even over a wide range of temperatures.

An optical imaging system, according to various embodiments, may include five lenses.

For example, the optical imaging system, according to the embodiments, may include a first lens, a second lens, a third lens, a fourth lens, and a fifth lens sequentially disposed from the object side. However, a person of ordinary skill in the relevant art will appreciate that the number of lenses in the optical system may vary, for example, between two to five lenses, while achieving the various results and benefits described hereinbelow.

The optical imaging system according to the embodiments is not limited to only including five lenses, but may further include other components, if necessary. For example, the optical imaging system may further include an image sensor that converts an image of a subject incident on the image sensor into an electrical signal. The image sensor is configured to capture an image of an object in a near infrared region as well as a visible region. In addition, the optical imaging system further includes a stop controlling an amount of light. For example, the stop is disposed between the second and third lenses.

In the optical imaging system, according to the embodiments, some of the first to fifth lenses may be formed of plastic or a polyurethane material, and others thereof may be formed of glass. In addition, the lenses formed of glass may have optical characteristics different from those of the lenses formed of plastic. For example, the first to fourth lenses may be formed of glass, and the fifth lens may be formed of plastic.

In addition, in the optical imaging system, according to the embodiments, some of the first to fifth lenses may be spherical lenses, and others thereof may be aspherical lenses. In other embodiments, all of the first to fifth lenses may be spherical lenses, or all of the first to fifth lenses may be aspherical lenses.

As an example, first and second surfaces of the first lens, the second lens, the third lens, and the fourth lens may be spherical, and the fifth lens may have at least one aspherical surface.

An aspherical surface of the fifth lens may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad (1)$$

In an example, c is a curvature (an inverse of a radius of curvature) of a lens, K is a conic constant, and Y is a distance from a certain point on an aspherical surface of the lens to an optical axis in a direction perpendicular to the optical axis. In addition, constants A to F are aspherical coefficients. In addition, Z is a distance between the certain point on the aspherical surface of the lens at the distance Y and a tangential plane meeting the apex of the aspherical surface of the lens.

The optical imaging system including the first to fifth lenses may have a positive refractive power/a positive refractive power/a negative refractive power/a positive refractive power/a negative refractive power sequentially from the object side towards the image side. However, although each lens is described with a particular refractive power, a different refractive power for at least one of the lenses may be used to achieve the intended result. For example, the first to fifth lenses may have a negative refractive power/a negative refractive power/a positive refractive power/a negative refractive power/a positive refractive power sequentially from the object side towards the image side.

The optical imaging system, according to the embodiments, may satisfy the following Conditional Expressions 1 to 9:

| | |
|---|---|
| $-6.5 < \{(1/f)*(Y/\tan \theta) - 1\}*100 < -1.0$ | (Conditional Expression 1) |
| $TTL/(2Y) < 2.0$ | (Conditional Expression 2) |
| $-7.0 < R1/f < 5.0$ | (Conditional Expression 3) |
| $-0.5 < (R1+R2)/(R1-R2) < 5.5$ | (Conditional Expression 4) |
| $0.1 < f/f1 < 0.6$ | (Conditional Expression 5) |
| $-2.5 < f/f3 < -1.0$ | (Conditional Expression 6) |
| $1.5 < f/EPD < 2.4$ | (Conditional Expression 7) |
| $5.0 < (T1+T2)/T3 < 12.0$ | (Conditional Expression 8) |
| $v5 < 24$ | (Conditional Expression 9) |

In an example, f is an overall focal length of the optical imaging system, Y is one-half of a diagonal length of an imaging plane of the image sensor, θ is one-half of a field of view (FOV) of the optical imaging system, TTL is a distance from an object-side surface of the first lens to the imaging plane of the image sensor, R1 is a radius of curvature of the object-side surface of the first lens, R2 is a radius of curvature of an image-side surface of the first lens, f1 is a focal length of the first lens, f3 is a focal length of the third lens, EPD is an entrance pupil diameter of the optical imaging system, T1 is a thickness of the first lens, T2 is a thickness of the second lens, T3 is a thickness of the third lens, and v5 is an Abbe number of the fifth lens.

Further, thicknesses of lenses refer to thicknesses thereof in a paraxial region or along an optical axis of the lenses.

Next, the first to fifth lenses forming the optical imaging system, according to various embodiments, will be described.

The first lens has a positive refractive power. In addition, the first lens has a meniscus shape of which the image-side surface is convex. For instance, a first surface (object-side surface) of the first lens is concave in the paraxial region, and a second surface (image-side surface) thereof is convex in the paraxial region.

Both surfaces of the first lens are spherical.

The second lens has a positive refractive power. In addition, the second lens has a meniscus shape of which an object-side surface is convex. In detail, a first surface (object-side surface) of the second lens is convex in the paraxial region, and a second surface (image-side surface) thereof is concave in the paraxial region.

Both surfaces of the second lens are spherical.

The third lens has a negative refractive power. Both surfaces of the third lens are concave. In detail, first and second surfaces (object-side surface and image-side surface) of the third lens are concave in the paraxial region.

Both surfaces of the third lens are spherical.

The fourth lens has a positive refractive power. In addition, the fourth lens has a meniscus shape of which an image-side surface is convex. In detail, a first surface (object-side surface) of the fourth lens is concave in the paraxial region, and a second surface (image-side surface) thereof is convex in the paraxial region.

Both surfaces of the fourth lens are spherical.

The fifth lens has a negative refractive power. In addition, the fifth lens has a meniscus shape of which an object-side surface is convex. In detail, a first surface (object-side surface) of the fifth lens is convex in the paraxial region, and a second surface (image-side surface) thereof is concave in the paraxial region.

At least one of the first and second surfaces of the fifth lens may be aspherical. For example, both surfaces of the fifth lens may be aspherical.

In the optical imaging system configured as described above, the first to fifth lenses perform an aberration correction function to increase an aberration improvement performance.

In addition, the optical imaging system may have an Fno (a constant indicating a brightness of the optical imaging system) of 2.22 or less to clearly capture an image of an object even in an environment in which an illumination is low.

In addition, the optical imaging system may clearly capture the image of the object in both a visible region and a near infrared region of the visible spectrum.

In addition, in the optical imaging system, according to the embodiments, the first to fourth lenses may be spherical lenses, and a cost required for manufacturing the optical imaging system may thus be reduced.

In addition, in the optical imaging system, according to the embodiments, the first to fourth lenses may be formed of glass having a relatively low coefficient of thermal expansion (CTE), such that a predetermined level of resolution may be secured even over a temperature range of −40 to 80° C. Therefore, the optical imaging system, according to the embodiments may implement a high level of resolution even in an environment in which there is a wide range of temperatures.

An optical imaging system, according to a first embodiment, will be described with reference to FIGS. 1 through 4.

The optical imaging system, according to the first embodiment, includes an optical system including a first lens 110, a second lens 120, a third lens 130, a fourth lens 140, and a fifth lens 150, and further includes a stop ST and an image sensor 160.

Respective characteristics (radii of curvature, thicknesses or distances between lenses, refractive indices, and Abbe numbers) of lenses are illustrated in FIG. 3.

Also, an overall focal length f of the optical imaging system, according to the first embodiment, may be 7.5 mm, an Fno (a constant indicating a brightness of the optical imaging system) thereof may be 2.22, and a field of view thereof may be 43.51°.

In the first embodiment, the first lens 110 has a positive refractive power, and a first surface thereof is concave in the paraxial region and a second surface thereof is convex in the paraxial region.

The second lens 120 has a positive refractive power, and a first surface thereof is convex in the paraxial region and a second surface thereof is concave in the paraxial region.

The third lens 130 has a negative refractive power, and a first surface and a second surface thereof are concave in the paraxial region.

The fourth lens 140 has a positive refractive power, and a first surface thereof is concave in the paraxial region and a second surface thereof is convex in the paraxial region.

The fifth lens 150 has a negative refractive power, and a first surface thereof is convex in the paraxial region and a second surface thereof is concave in the paraxial region.

Figures 4, 5:
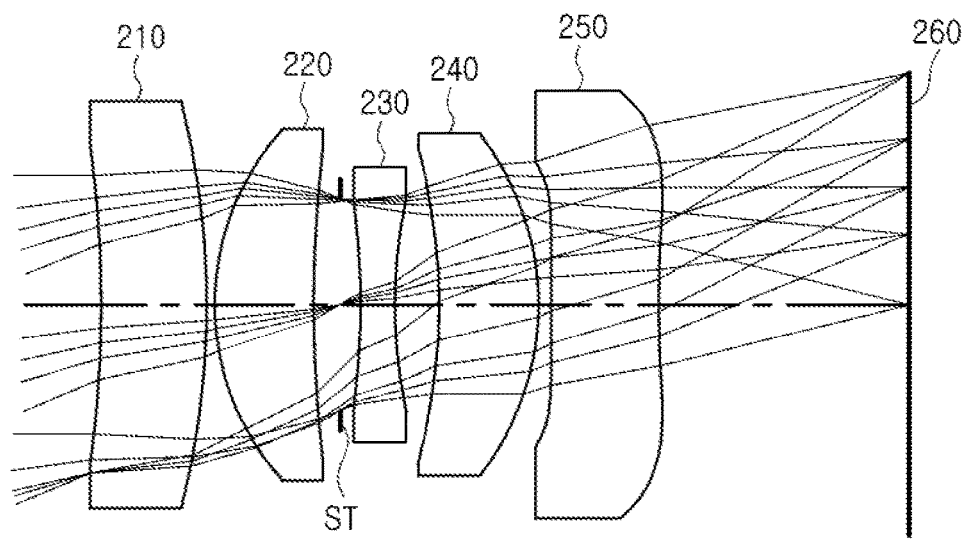
FIG. 4 is a table representing aspherical coefficients of lenses of the optical imaging system illustrated in FIG. 1.
FIG. 5 is a view illustrating an optical imaging system according to a second embodiment.

Meanwhile, the first and second surfaces of the fifth lens 150 have aspherical coefficients as illustrated in FIG. 4. For example, both of the first and second surfaces of the fifth lens 150 are aspherical, and both of the first and second surfaces of the first lens 110, the second lens 120, the third lens 130, and the fourth lens 140 are spherical.

In addition, the first to fourth lenses 110 to 140 are formed of glass, and the fifth lens 150 is formed of plastic.

In addition, the stop ST is disposed between the second lens 120 and the third lens 130.

Figure 2:
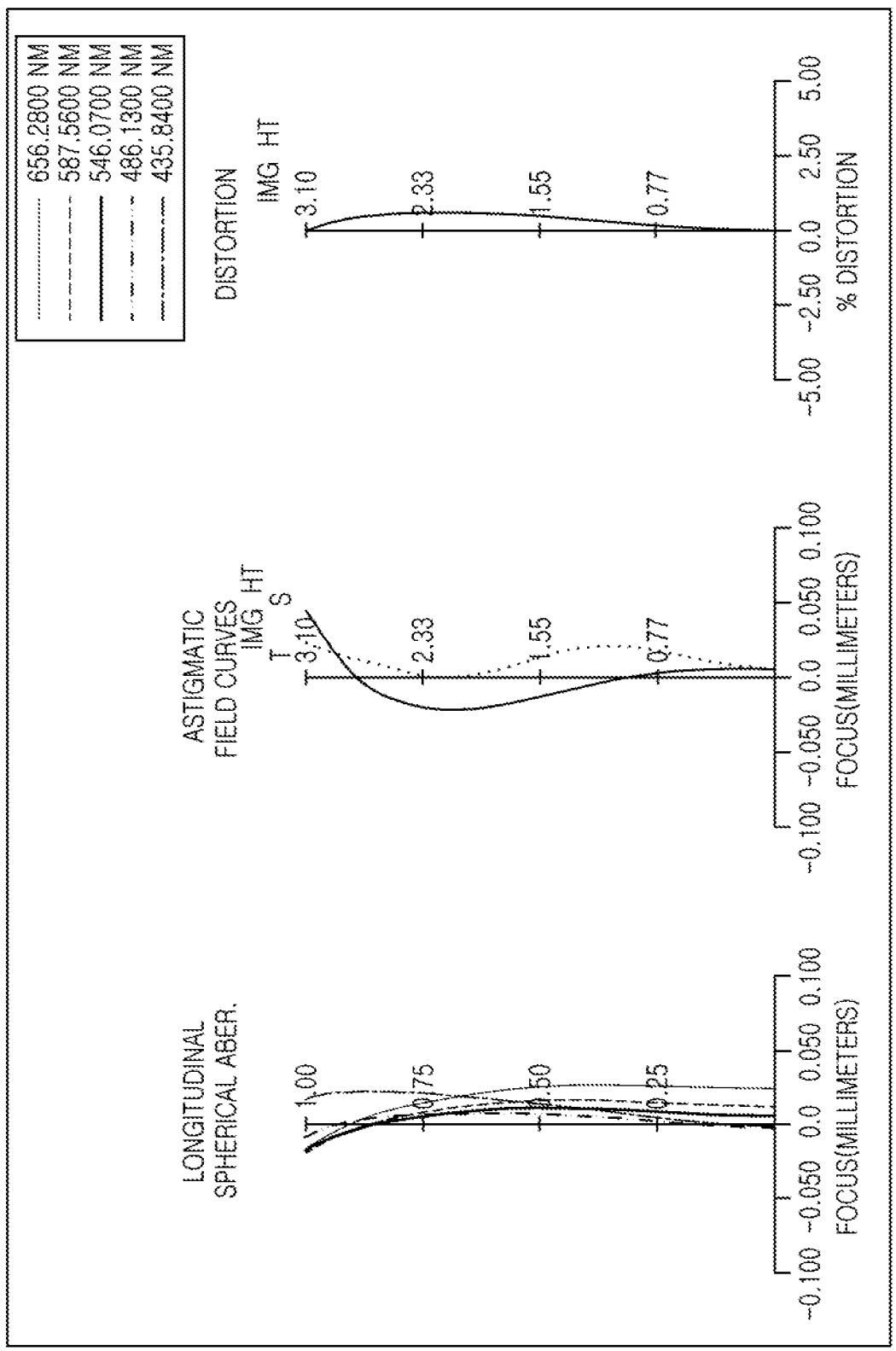
FIG. 2 illustrates graphs of curves representing aberration characteristics of the optical imaging system illustrated in FIG. 1.

In addition, the optical imaging system configured as described above has aberration characteristics illustrated in FIG. 2.

An optical imaging system, according to a second embodiment, will be described with reference to FIGS. 5 through 8.

The optical imaging system, according to the second embodiment, includes an optical system including a first lens 210, a second lens 220, a third lens 230, a fourth lens 240, and a fifth lens 250, and further includes a stop ST and an image sensor 260.

Respective characteristics (radii of curvature, thicknesses or distances between lenses, refractive indices, and Abbe numbers) of lenses are illustrated in FIG. 7.

Also, an overall focal length f of the optical imaging system according to the second embodiment is 7.0 mm, an Fno (a constant indicating a brightness of the optical imaging system) thereof is 2.06, and a field of view thereof is 46.4°.

In the second embodiment, the first lens 210 has a positive refractive power, and a first surface thereof is concave in the paraxial region and a second surface thereof is convex in the paraxial region.

The second lens 220 has a positive refractive power, and a first surface thereof is convex in the paraxial region and a second surface thereof is concave in the paraxial region.

The third lens 230 has a negative refractive power, and a first surface and a second surface thereof are concave in the paraxial region.

The fourth lens 240 has a positive refractive power, and a first surface thereof is concave in the paraxial region and a second surface thereof is convex in the paraxial region.

The fifth lens 250 has a negative refractive power, and a first surface thereof is convex in the paraxial region and a second surface thereof is concave in the paraxial region.

Further, the first and second surfaces of the fifth lens 250 may have aspherical coefficients as illustrated in FIG. 8. For example, both of the first and second surfaces of the fifth lens 250 are aspherical, and both of the first and second surfaces of the first lens 210, the second lens 220, the third lens 230, and the fourth lens 240 are spherical.

In addition, the first to fourth lenses 210 to 240 are formed of glass, and the fifth lens 250 is formed of plastic.

In addition, the stop ST is disposed between the second lens 220 and the third lens 230.

Figure 6:
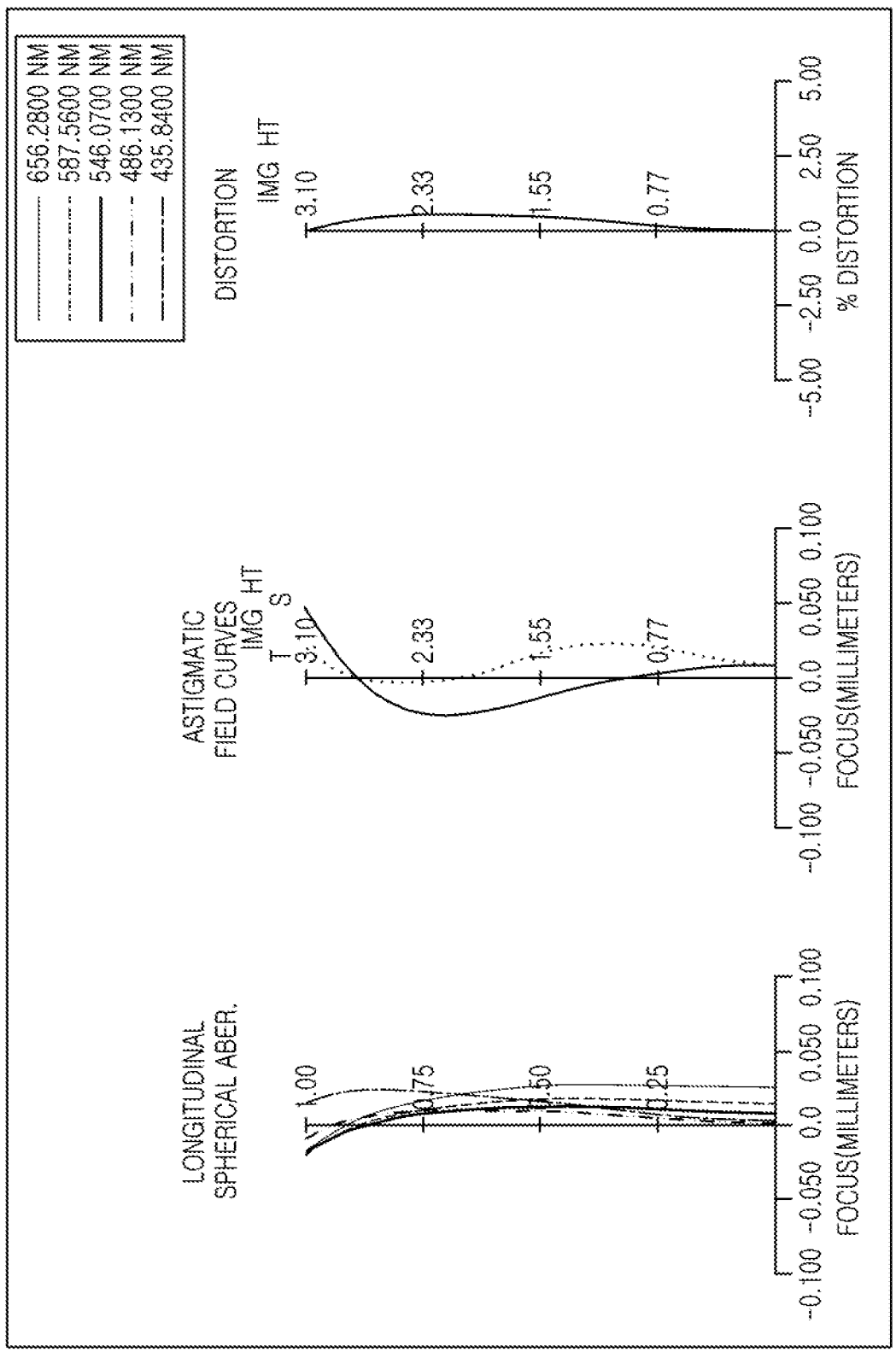
FIG. 6 illustrates graphs of curves representing aberration characteristics of the optical imaging system illustrated in FIG. 5.

In addition, the optical imaging system configured as described above may have aberration characteristics illustrated in FIG. 6.

As set forth above, in the optical imaging systems, according to the embodiments, an aberration improvement effect is increased, a high level of resolution is implemented, an image is captured even in an environment in which an illumination is low, and a deviation in resolution is suppressed even over a wide range of temperatures.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power;
   a second lens having a refractive power, a convex object-side surface, and a concave image-side surface;
   a third lens having a negative refractive power;

a fourth lens having a positive refractive power and a concave object-side surface; and a fifth lens having a negative refractive power, wherein the first to fifth lenses are sequentially disposed in ascending numerical order from an object side of the optical imaging system toward an imaging plane of the optical imaging system.

2. An optical imaging system comprising:

a first lens having a positive refractive power;

a second lens having a refractive power, a convex object-side surface, and a concave image-side surface;

a third lens having a negative refractive power;

a fourth lens having a positive refractive power; and a fifth lens having a negative refractive power, wherein the first to fifth lenses are sequentially disposed in ascending numerical order from an object side of the optical imaging system toward an imaging plane of the optical imaging system, the imaging plane is an imaging plane of an image sensor, and TTL/(2Y)<2.0 is satisfied, where TTL is a distance from an object-side surface of the first lens to the imaging plane of the image sensor, and Y is one-half of a diagonal length of the imaging plane of the image sensor.

3. The optical imaging system of claim 1, wherein $-7.0<R1/f<5.0$ is satisfied, where R1 is a radius of curvature of an object-side surface of the first lens, and f is an overall focal length of the optical imaging system.

4. The optical imaging system of claim 1, wherein $-2.5<f/f3<-1.0$ is satisfied, where f is an overall focal length of the optical imaging system, and f3 is a focal length of the third lens.

5. The optical imaging system of claim 1, wherein $5.0<(T1+T2)/T3<12.0$ is satisfied, where T1 is a thickness of the first lens, T2 is a thickness of the second lens, and T3 is a thickness of the third lens.

6. The optical imaging system of claim 1, wherein the third lens has a concave image-side surface.

7. The optical imaging system of claim 6, wherein the third lens has a concave object-side surface.

8. The optical imaging system of claim 1, wherein the fourth lens has a convex image-side surface.

9. The optical imaging system of claim 1, wherein the fifth lens has a concave image-side surface.

10. The optical imaging system of claim 1, wherein the imaging plane is an imaging plane of an image sensor, and TTL/(2Y)<2.0 is satisfied, where TTL is a distance from an object-side surface of the first lens to the imaging plane of the image sensor, and Y is one-half of a diagonal length of the imaging plane of the image sensor.

* * * * *